(12) United States Patent
Schad et al.

(10) Patent No.: US 6,503,075 B1
(45) Date of Patent: Jan. 7, 2003

(54) STACK MOLD CARRIER AND ROTARY TURRET WITH SERVICES PROVIDED BY A ROTARY UNION

(75) Inventors: Robert D Schad, North York (CA); Bruce F Coxhead, Nobleton (CA)

(73) Assignee: Husky Injection Molding Systems, Ltd. (CA)

( * ) Notice: Subject to any disclaimer, the term of this patent is extended or adjusted under 35 U.S.C. 154(b) by 184 days.

(21) Appl. No.: 09/648,936

(22) Filed: Aug. 24, 2000

(51) Int. Cl.[7] .............................................. B29C 45/17
(52) U.S. Cl. ...................... 425/576; 425/338; 425/588; 425/592
(58) Field of Search .......................... 264/297.2, 328.8; 425/451.5, 451.6, 574, 575, 576, 592, 593, 112, 338, 588

(56) References Cited

U.S. PATENT DOCUMENTS

| | | | |
|---|---|---|---|
| 3,224,043 A | 12/1965 | Lameris et al. ............. | 425/134 |
| 3,880,560 A | 4/1975 | Takahashi ................... | 425/130 |
| 3,940,223 A | 2/1976 | Farrell ........................ | 425/244 |
| 3,941,539 A | 3/1976 | Saumsiegle et al. ........ | 425/242 |
| 3,947,176 A | 3/1976 | Rainville .................... | 425/130 |
| 4,243,362 A | 1/1981 | Rees et al. .................. | 425/130 |
| 4,408,981 A * | 10/1983 | Brown ........................ | 425/589 |
| 4,422,995 A | 12/1983 | Schad ......................... | 264/250 |
| 4,427,359 A | 1/1984 | Fukuoka ..................... | 425/525 |
| 4,444,711 A | 4/1984 | Schad ......................... | 264/243 |
| 4,460,534 A | 7/1984 | Boehm et al. .............. | 264/246 |
| 4,734,023 A | 3/1988 | Nesch et al. ................ | 425/130 |
| 5,707,666 A | 1/1998 | DiSimone et al. .......... | 425/588 |
| 5,728,409 A | 3/1998 | Schad et al. ................ | 425/130 |
| 5,817,345 A * | 10/1998 | Koch et al. ................. | 425/130 |
| 5,830,404 A * | 11/1998 | Schad et al. ............. | 264/297.2 |
| 5,837,301 A * | 11/1998 | Arnott et al. ............... | 425/574 |
| 6,099,784 A * | 8/2000 | Teng et al. ............... | 264/297.2 |
| 6,139,305 A * | 10/2000 | Nesch ......................... | 425/130 |
| 6,155,811 A * | 12/2000 | Looije et al. ............... | 425/190 |

* cited by examiner

Primary Examiner—Jan H. Silbaugh
Assistant Examiner—Emmanuel Luk
(74) Attorney, Agent, or Firm—Katten Muchin Zavis Rosenman

(57) ABSTRACT

The present invention relates to stack mold carriers in an injection molding machine with a rotating turret. Services to the rotating turret are provided by a rotary union attached to the translating mold carrier at the turret's axis of rotation. Hence, services such as oil, water, air and electrical power are provided to the rotating turret thereby allowing the turret to rotate in either direction. The rotating turret is attached to linkages which open and closed the molds through connection to a moving and a stationary platen which interface with the rotating turret to form molded articles therein.

18 Claims, 6 Drawing Sheets

STACK MOLD CARRIER AND ROTARY TURRET WITH SERVICES PROVIDED BY A ROTARY UNION

BACKGROUND OF THE INVENTION

1. Field of the Invention

The present invention relates to an improved injection molding machine with a stack mold carrier. More particularly, the present invention relates to a stack mold carrier for an injection molding machine wherein the services to a rotating turret is provided by a rotary union at the pivot of the stack mold.

2. Related Prior Art

Stack mold systems for molding articles are well known in the prior art. Early stack mold carriers were attachments to the mold center section that supported it in the molding machine and allowed the center section to slide along the machine's tiebars. U.S. Pat. No. 4,408,981 to Brown shows a carrier riding on the lower tie bars. Removal of the mold required the removal of the carrier as they were not attached to the machine.

Another such stack mold is shown in U.S. Pat. No. 5,707,666 to DiSimone et al. The '666 Patent stack mold system has a unique linkage arrangement whereby a center section and a movable end platen is displaced from the stationary platen at different rates, thereby opening and closing the stack mold during the injection molding process. In this patent, the center section does not rotate, but only translates away from the fixed platen.

Turret style molding machines are also well know in the prior art. A turret style molding machine includes a center or end platen that rotates following an injection cycle to either align with a post-molding operation (ie, cooling, forming, etc.) or with another injector in a multi-material application. U.S. Pat. No. 4,427,359 to Fukuoka discloses an injection stretch blow molding machine. The machine incorporates a four sided turret block positioned on a vertical axis wherein preforms are injection molded in a first position of the four sided turret block. Preforms are temperature conditioned inside a second conditioning mold at a second position of the block. The preforms are blow molded at a third position and ejected at a fourth.

U.S. Pat. No. 4,243,362 to Rees discloses a composite molding apparatus for molding articles from two materials. The apparatus includes a four sided turret block rotatable between two opposed faces about a horizontal axis. The block is mounted slidably between a fixed and a moving platen of a horizontal injection molding machine. Two material molding is achieved by injecting different materials from separate injectors when the block is in each of the two positions.

U.S. Pat. No. 5,728,409 to Schad et al., teaches a turret style injection molding machine having a rotating and longitudinally movable turret block with a plurality of mold halves rotatable and movable into engagement with a non-rotatable mold half and at least one additional molding related operation. Services to the rotating turret block are provided by a rotary union located at the axis of rotation of the turret block.

U.S. Pat. No. 4,734,023 to Nesch et al. discloses a turret style injection molding machine in a stack mold configuration. The turret rotates in 90° intervals to align with a first and second injector. This apparatus uses two fixed platens and a movable platen in communication with the rotating turret. The movable platen is connected to the fixed platens via a plurality of tiebars which also support and guide the platens. The movable platen and turret are operated by an inline hydraulic cylinder.

There exists a need for an improved stack mold injection molding machine that provides a rotating turret where services are provided to the rotating turret through a rotary union. In addition, it is desirable to incorporate features in conjunction with a rotary turret whereby the mold may be removed without the removal of the tiebars.

SUMMARY OF THE INVENTION

The primary objective of the present invention is to provide an improved stack mold injection molding machine with a rotating turret.

Another object of the invention is to provide a means for providing services like water, hydraulic oil, pressurized air, electrical power, etc. to the rotating turret of a stack mold injection molding machine.

A further object of the present invention is to provide a stack mold injection molding machine with a drive means for selectably rotating a turret.

Yet another object of the present invention is to provide a stack mold injection molding machine with a rotating turret whereby turret rotation is independent of the clamp motion.

Still yet another object of the present invention is to provide a stack mold injection machine that reduces the mold open time and allows for part removal from the top or the bottom of the rotating turret.

Yet another object of the present invention is to provide a rotating turret in a stack mold injection machine that eliminates swinging hoses and electrical cables by the use of a rotary union.

The foregoing objects are achieved by the present invention which comprises a pair of mold supports to which the rotating turret can be attached. Each mold support is movable along a linear rail attached to the base of a molding machine and has at least one block containing a linear bearing mounted thereto for engaging the linear rail. Each mold support further includes a linkage assembly for connecting the mold support to other platens to synchronize movement of each mold support with movement of at least one other platen. Rotatably attached between a pair of mold supports is a turret which comprises at least one mold cavity for interface with at least one platen. Attached to at least one mold support is an actuator like an electric servomotor and in communication with the turret for rotation about a central axis. Provided to the rotating turret through the central axis of rotation is a rotary union for the communication of various services like oil, water, air, electrical power, etc.

Other details of the present invention, as well as other objects and advantages attendant thereto are set forth in the following detailed description and the accompanying figures, in which like reference numerals depict like elements.

DETAILED DESCRIPTION OF THE PREFERRED EMBODIMENTS

Figure 1:
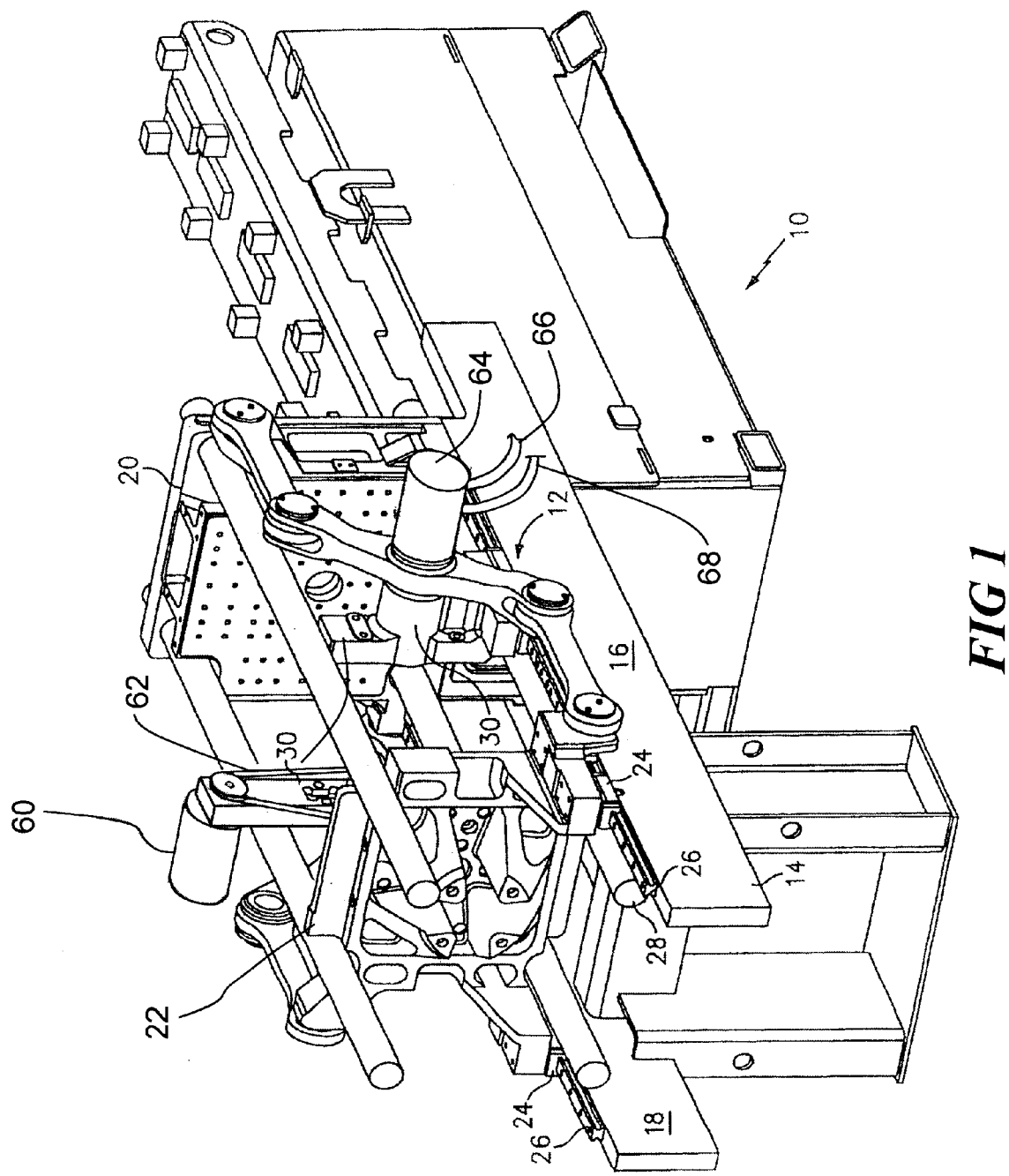
FIG. 1 is an isometric view of a machine base and platen assembly with stack mold linkages and rotary union in accordance with the present invention.

Referring to the drawings, FIG. 1 illustrates a molding machine 10 with the stack mold carrier assembly 12 of the present invention. The molding machine 10 has a clamp base 14 which includes two lateral support structures 16 and 18. The molding machine 10 further has two platens 20 and 22 to which molds (not shown) are attached. Platen 20 is a fixed or stationary platen, while platen 22 is a movable platen which rides on linear bearings 24 that engage fixed linear rails 26 fastened to the support structures 16 and 18. The molding machine 10 also includes means (not shown) for moving the platen 22 between mold closed and mold open positions. The means for moving the platen 22 may be accomplished using a hydraulic piston or other similar means operatively attached to the platen 22, or in the alternative may be operatively attached to the linkage of the present invention. Tiebars 28 are provided to add structural support to the machine and extend from the stationary platen 20 to a mold clamping unit (not shown) or other support (not shown). In the molding machine 10, the tiebars 28 are not used to align or support the moving platen 22 or the stack mold carrier assembly 12.

Figure 2:
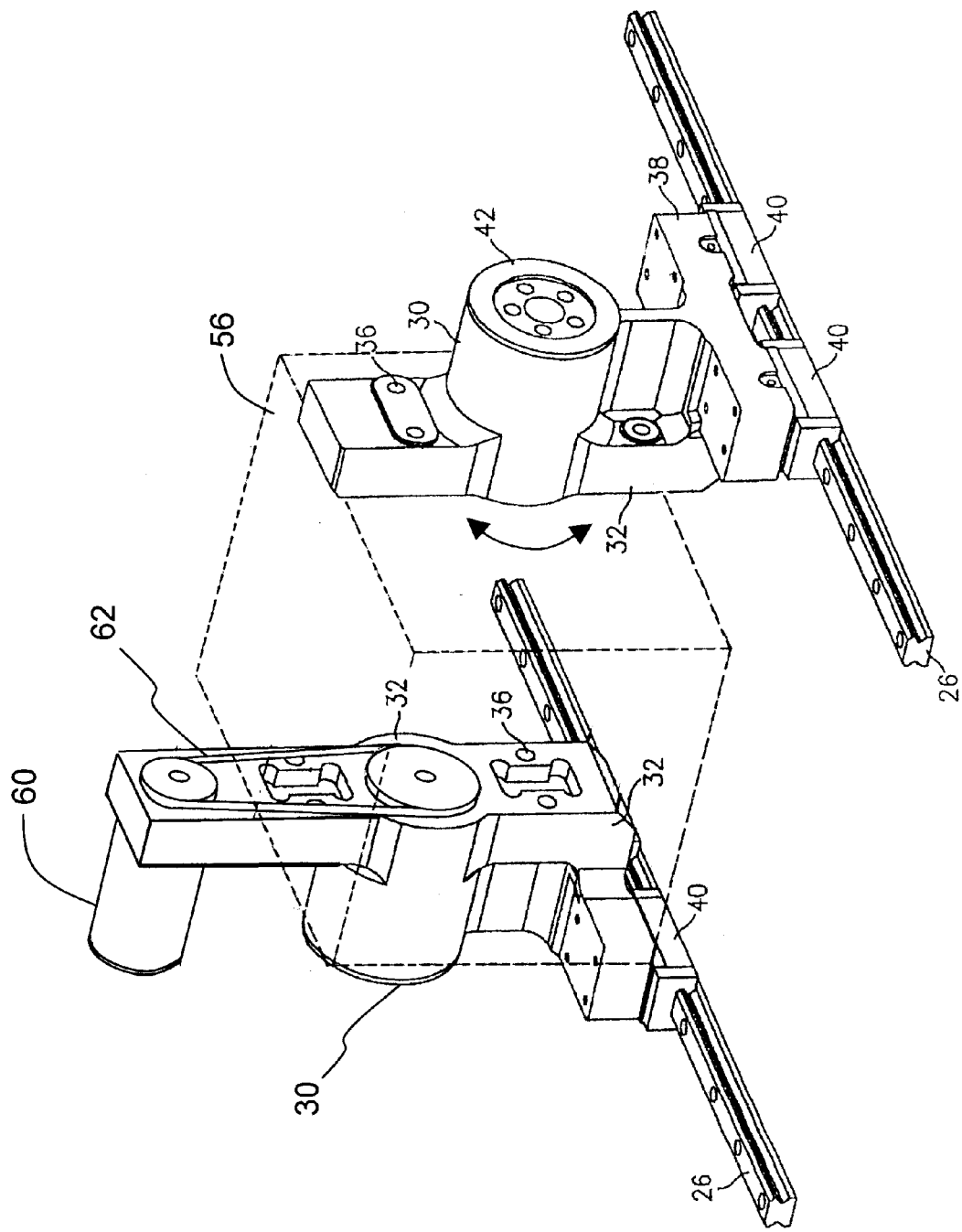
FIG. 2 is an isometric view of the mold supports with the rotating turret and rotary union.

As shown in the drawings, the stack mold carrier assembly 12 for supporting a rotating turret 56 comprises two mold supports or pillar castings 30 positioned on the support structures 16 and 18. The rotational axis of the turret 56 can be either horizontal or vertical. Referring now to FIG. 2, each pillar casting 30 has a vertical post portion 32 that contains through holes 36 for acceptance of mounting bolts. The bolts are used to align and fasten each pillar casting 30 to a respective side of the rotating turret 56 of the stack mold in a known fashion. Any suitable connection means known in the art may be used to rotatably mount the turret 56 to the pillar castings 30. Each pillar casting 30 has a base support 38 to which is fastened one or more blocks 40 containing linear bearings that engage and run a respective linear rail 26 mounted to one of the side supports 16, 18. The linear rail 26 may be the same rail used to guide the moving platen 22 or may be a second rail mounted parallel to the linear rail used to guide the moving platen 22 and offset outboard to provide a dedicated alignment means for the stack mold carrier assembly pillar casting 30.

Figure 3:
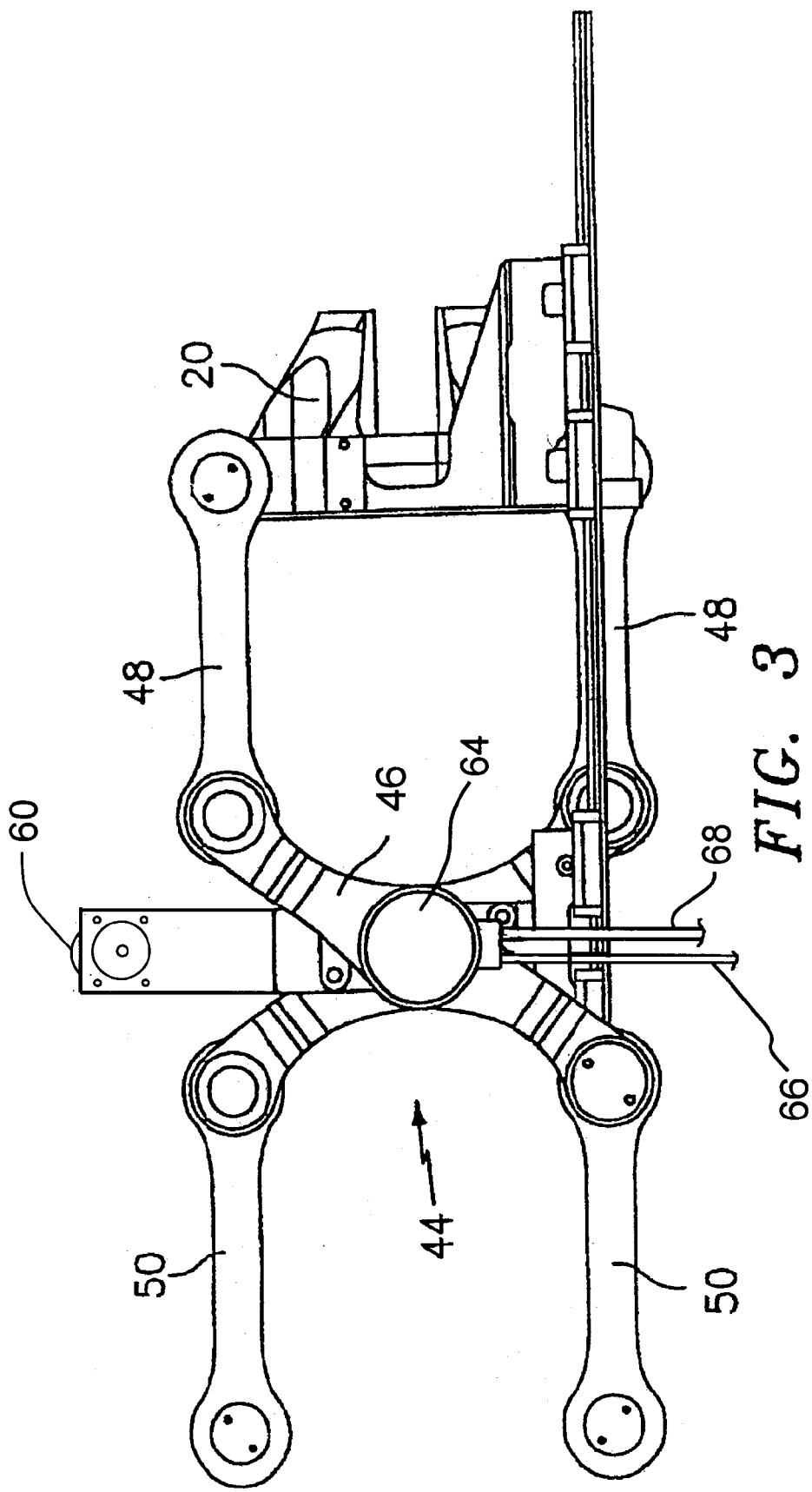
FIG. 3 is a plan side view of the stack mold linkage of the present invention.
Figure 4:
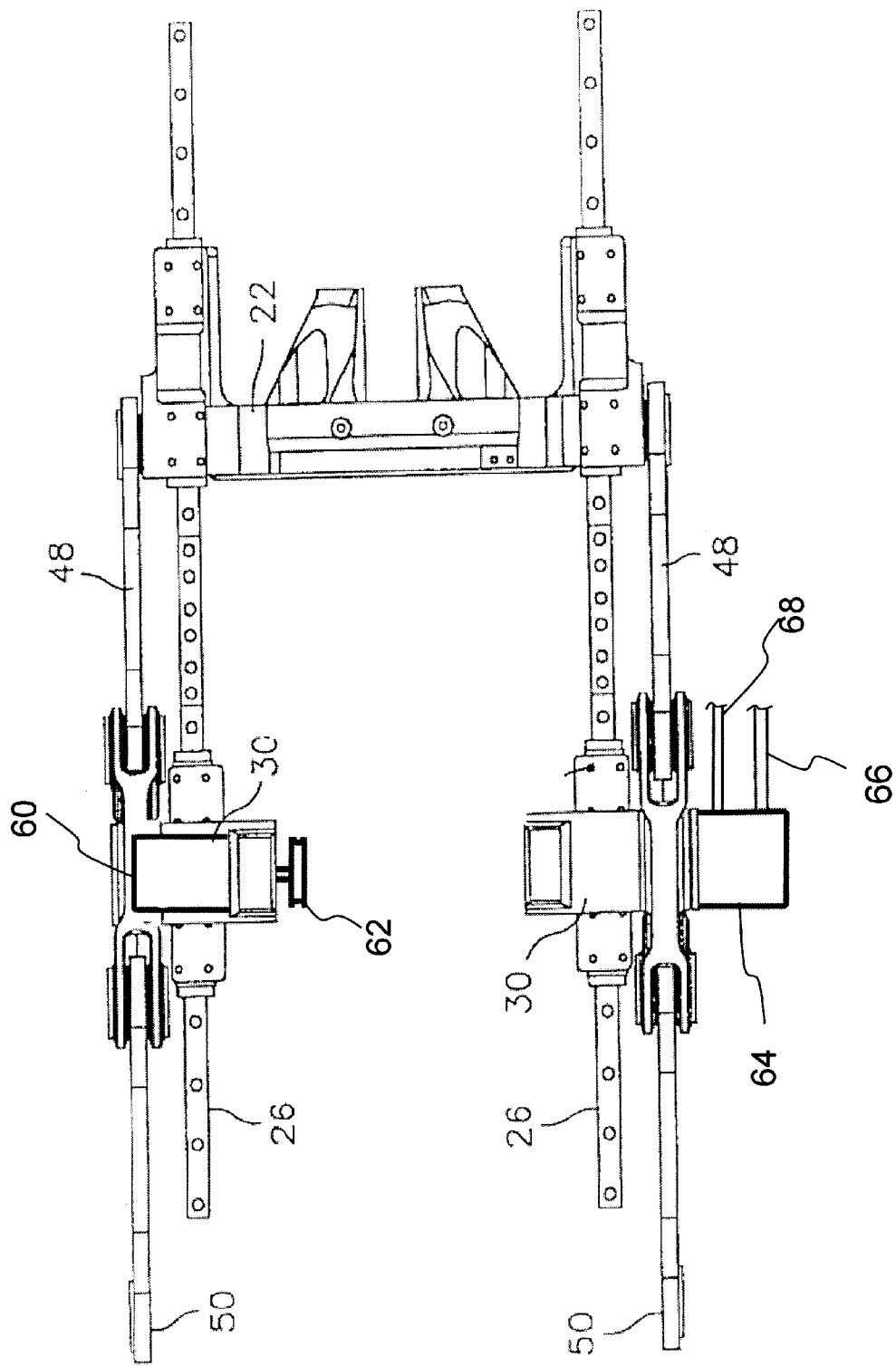
FIG. 4 is a plan top view of the stack mold linkage of the present invention.
Figure 5:
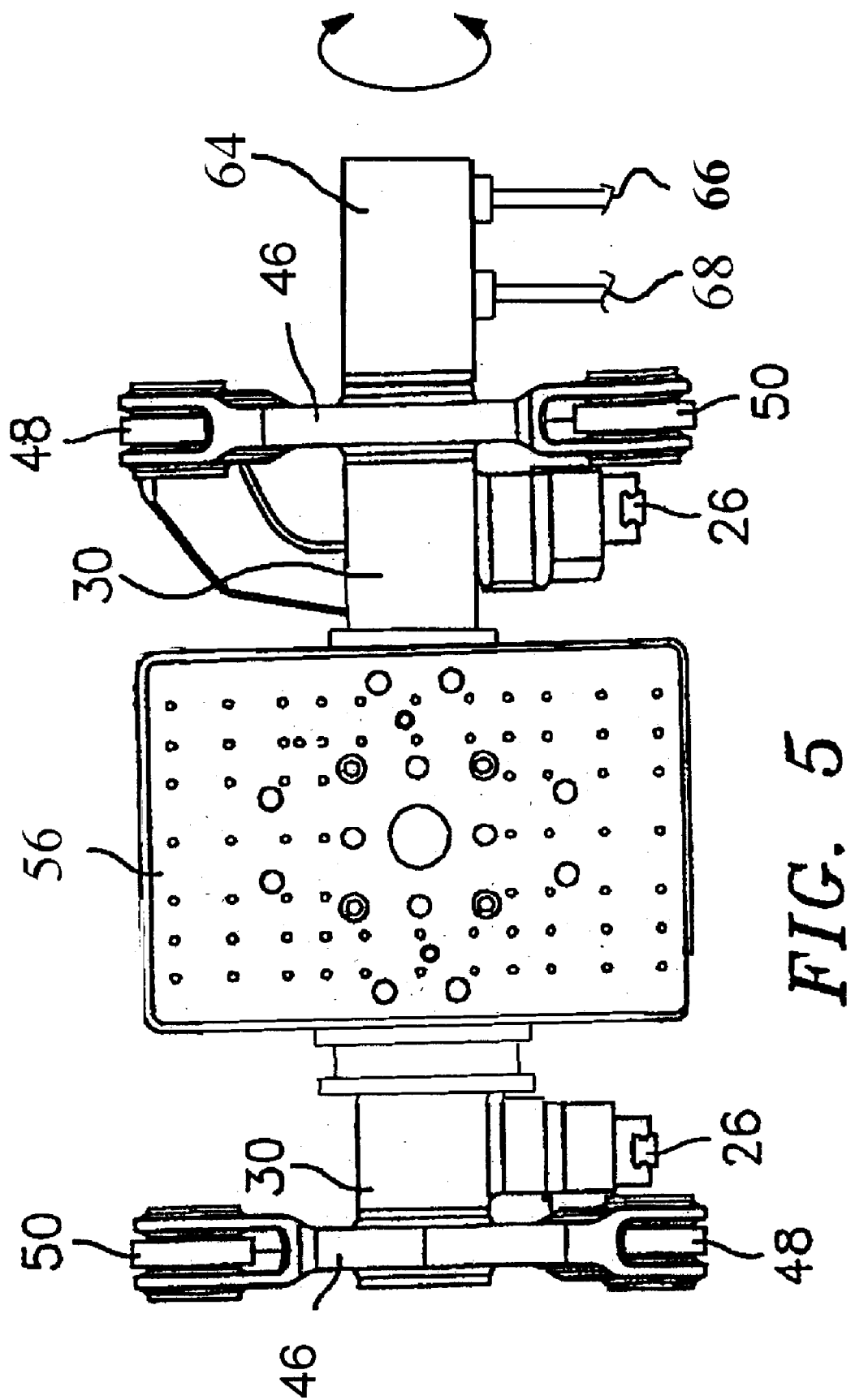
FIG. 5 is a cross sectional view of the rotating turret with the rotary union of the present invention.

Each pillar casting 30 has a third portion, a boss 42, to which carrier linkage assembly 44 is rotatably mounted. Any suitable connection means known in the art may be used to rotatably mount the linkage assembly 44 to the boss 42. The linkage assembly 44, as shown in FIGS. 3–5, has a propeller 46 rotatably mounted to the boss 42. The propeller 46 has links 48 and 50 rotatably mounted to its ends. Link 48 is rotatably mounted to stationary platen 20, while link 50 is rotatably mounted to the moving platen 22. The motion of the moving platen 22 between mold closed and mold open position causes the linkage assembly 44 to move each pillar casting 30 along a respective rails 26 and maintain each pillar casting 30, and hence the turret 56, midway between the platens 20 and 22 for the entire platen stroke. This is a conventional and well known method of mold carrier movement.

Alternatively, each pillar casting 30 and the moving platen 22 could be moved along a plurality of tie bars (not shown). The tie bars would support and guide the moving pillar casting 30 and platen 22. The tie bars would obviate the need for the linear rails 26 and the blocks 40 which contain the linear bearings. This type of structure is also well known in the injection molding art.

Also mounted to at least one pillar casting 30 is an actuator 60 that is in mechanical communication with the rotating turret 56 through a transmission 62. In the preferred embodiment the transmission 62 can be belts, gears, linkages or the like. The actuator 60 is used to selectably rotate in either direction the turret 56 when the mold is in the mold open position. Also mounted to at least one pillar casting 30 is a rotary union 64 which communicates the flow of services for example cooling water 66 and electrical power 68 to the rotating turret 56. The rotary union 64 allows the turret 56 to rotate in either direction (clockwise/counterclockwise) through any angular displacement while maintaining the flow of services to the turret 56. In the preferred embodiment, and by way of example only, the services can include hydraulic oil, water, pressurized air, electrical power or the like. For using these services, turret 56 also includes the required circuitry and control valves on board and movable with the turret.

In the event the turret 56 of the stack mold assembly is removed from the machine 10 and from the stack mold carrier assembly 12, the carrier assembly 12 remains attached to the machine 10 and will not fall inward or outward.

Figure 6:
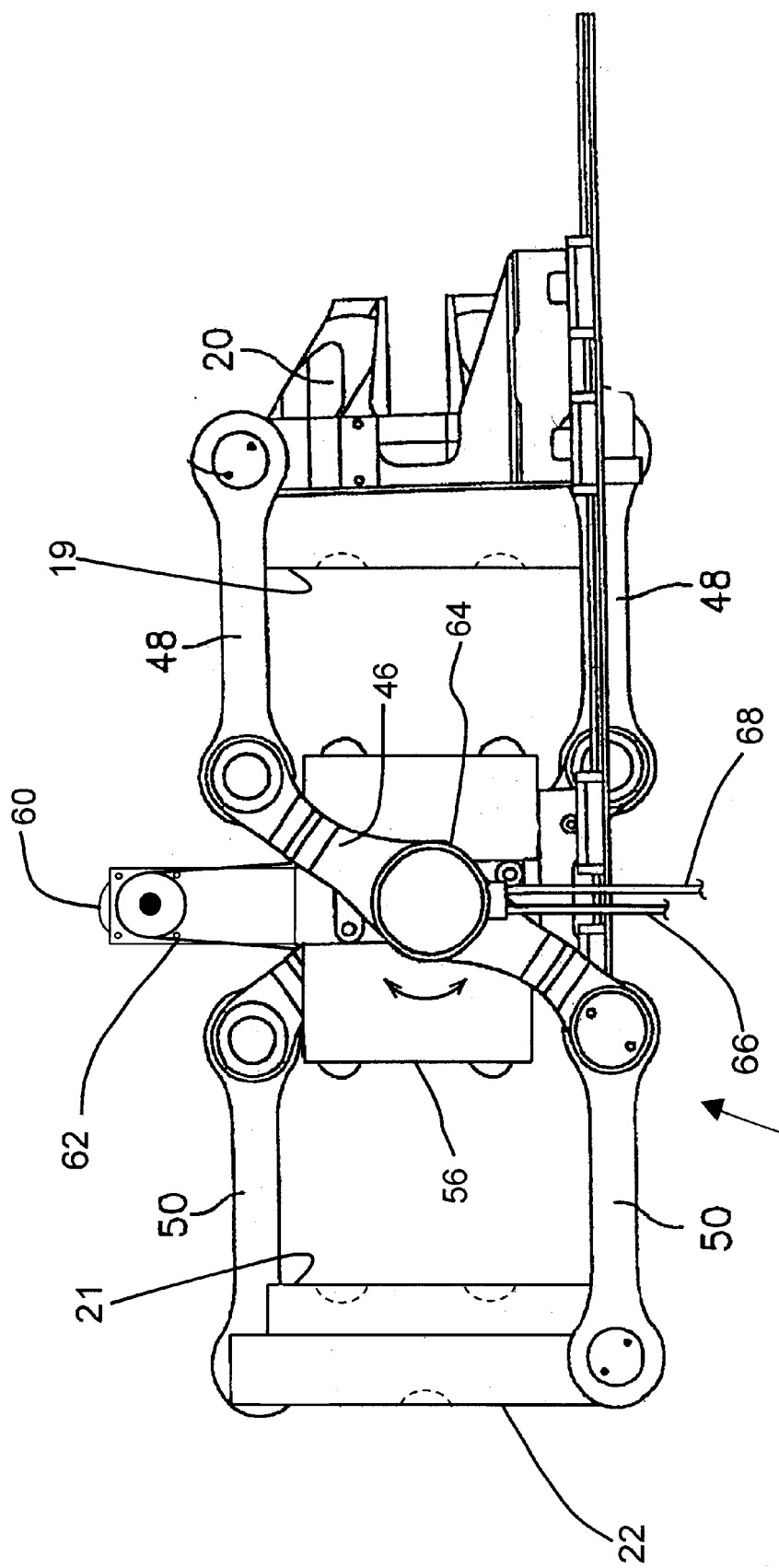
FIG. 6 is a side plan view of the linkage in accordance with the present invention with mold halves installed on the platens.

Referring to FIG. 6, a first mold half 21 is mounted to the fixed platen 22 in alignment with mold cavities that are in the turret 56. A second mold half 19 is mounted to the movable platen 20 in alignment with another set of mold cavities that are in the turret 56. In a preferred embodiment, the turret 56 is selectably rotated by the actuator 60 to align the mold cavities in the turret 56 with a set of corresponding mold cavities on mold halves 19, 21. Once aligned, the carrier assembly 12 is actuated to the mold closed position, whereby an injection molded article may be fabricated in each mold cavity.

Within this configuration, one could easily envision myriad pre and post processing operations during an injection molding cycle. For example, based on a four station turret, one station could injection mold a preform, a second station could temperature condition the preform, a third station could blow mold the preform into a full size plastic container, and the fourth station could eject the part on a conveyor for further processing/packaging. To transfer the article from one station to the next, the carrier assembly 12 is opened, the actuator 60 rotates the turret 56 through an arcuate sector to align the turret with a respective station and the carrier assembly 12 is closed.

Thus, the reader can see an improved stack mold injection molding machine with a rotary turret is provided. The use of the rotary union 64 allows for the rotation of the turret in any direction without restriction. The rotary union 64 provides a common interface to the rotating turret 56 which eliminates swinging hoses and clamps. The rotary union 64 also reduces the work required to disassembly and maintain the stack mold machine.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an injection molding machine having a stationary platen and a movable platen, a stack mold carrier assembly comprising;
    a pair of mold supports to which a turret can be rotatably attached for rotation about a rotational axis;
    each mold support being movable along a linear rail;
    each mold support having at least one block containing a linear bearing mounted thereto for engaging said linear rail, each mold support having a linkage assembly mounted thereto and said linkage assembly being connected to the stationary platen and the movable platen; and
    a rotary union rigidly affixed at said rotational axis for the communication of services to said turret.

2. The stack mold carrier assembly of claim 1, wherein said rotational axis is substantially vertical.

3. The stack mold carrier assembly of claim 1, wherein said rotational axis is substantially horizontal.

4. The stack mold carrier assembly of claim 1, wherein said rotational axis is substantially perpendicular to said linear rail.

5. The stack mold carrier assembly of claim 1, further comprising a linkage assembly attached to each mold support for joining said mold support to at least one platen.

6. The stack mold carrier assembly of claim 5, wherein each mold support has a boss to which said linkage assembly is rotatably mounted.

7. The stack mold carrier assembly of claim 1, wherein said services is at least one selected from the group consisting of hydraulic oil, water, air, electrical power and cooling fluid.

8. The stack mold carrier assembly of claim 1, further comprising an actuator in communication with said turret for rotating said turret about said rotational axis.

9. The stack mold carrier assembly of claim 8, wherein said turret is rotatable through arcuate sectors for moving at least one mold half to at least one work station positioned at the beginning of at least one of said arcuate sectors.

10. The stack mold carrier assembly of claim 8, wherein said actuator is rigidly affixed to one said mold support.

11. A molding machine comprising:
    a base having lateral support structures;
    each of said lateral support structures having at least one linear rail mounted thereon; and
    a stack mold system including a stationary platen fixed to said base, a movable platen, and a carrier assembly for supporting a rotating turret; and
    said carrier assembly comprising two mold supports; and
    each of said mold supports having at least one block containing a linear bearing mounted thereto for allowing said respective mold support to slide along said at least one linear rail on a respective one of said lateral support structures, each mold support having a linkage assembly mounted thereto and said linkage assembly being connected to said stationary platen and said movable platen;
    an actuator in communication with said turret for rotating said turret about a rotational axis; and
    a rotary union mounted to said turret at said rotational axis for communication of services to said turret.

12. A molding machine according to claim 11, wherein said linkage assembly comprises a propeller mounted to said mold support, a first link connected to said propeller and said stationary platen, and a second link connected to said propeller and said movable platen.

13. A molding machine according to claim 11, further comprising:
    a plurality of tiebars; and
    said movable platen and each of said mold supports being independent of said tiebars.

14. A molding machine comprising:
    a plurality of tie bars; and
    a stack mold system including a stationary platen fixed to at least one said tie bar, a movable platen supported and guided by said tie bars, and a carrier assembly for supporting a rotating turret; and
    said carrier assembly comprising two mold supports; and
    each of said mold supports being guided and supported by at least one said tie bar for allowing said respective mold support to slide along said at least one tie bar, each mold support having a linkage assembly mounted thereto and said linkage assembly being connected to said stationary platen and said movable platen; and
    an actuator in communication with said turret for rotating said turret about a rotational axis; and
    a rotary union mounted to said turret at said rotational axis for communication of services to said turret.

15. A molding machine according to claim 14, wherein said linkage assembly comprises a propeller mounted to said mold support, a first link connected to said propeller and said stationary platen, and a second link connected to said propeller and said movable platen.

16. A molding machine according to claim 14, wherein said rotational axis is substantially perpendicular to said tie bars.

17. A molding machine according to claim 14, wherein said services is at least one selected from the group consisting of hydraulic oil, water, air, electrical power and cooling fluid.

18. A molding machine according to claim 14, further including an article molding area defined between said platens and an article removal area, wherein said article removal area is located outside of said article molding area allowing for clear access to finished molded articles, wherein a means for removing said articles is positioned for operation in said article removal area.

* * * * *